US007054811B2

(12) United States Patent
Barzilay

(10) Patent No.: US 7,054,811 B2
(45) Date of Patent: May 30, 2006

(54) METHOD AND SYSTEM FOR VERIFYING AND ENABLING USER ACCESS BASED ON VOICE PARAMETERS

(75) Inventor: Ziv Barzilay, Ramat HaSharon (IL)

(73) Assignee: Cellmax Systems Ltd., Tel Aviv (IL)

( * ) Notice: Subject to any disclaimer, the term of this patent is extended or adjusted under 35 U.S.C. 154(b) by 0 days.

(21) Appl. No.: 10/958,498

(22) Filed: Oct. 6, 2004

(65) Prior Publication Data
US 2005/0096906 A1 May 5, 2005

Related U.S. Application Data

(63) Continuation-in-part of application No. PCT/IL03/00388, filed on May 14, 2003, and a continuation-in-part of application No. 10/288,579, filed on Nov. 6, 2002.

(60) Provisional application No. 60/598,543, filed on Aug. 4, 2004.

(51) Int. Cl.
G10L 17/00 (2006.01)
G10L 21/00 (2006.01)

(52) U.S. Cl. .................. 704/246; 704/270.1; 704/270; 704/275; 704/273; 704/247

(58) Field of Classification Search ................ 704/231, 704/246, 270.1, 270, 275, 273, 247
See application file for complete search history.

(56) References Cited

U.S. PATENT DOCUMENTS

| 5,271,088 A | | 12/1993 | Bahler |
| 5,297,194 A | * | 3/1994 | Hunt et al. ............. 379/88.02 |
| 5,365,574 A | * | 11/1994 | Hunt et al. ............. 379/88.02 |
| 5,499,288 A | * | 3/1996 | Hunt et al. ............. 379/88.02 |
| 5,774,858 A | * | 6/1998 | Taubkin et al. ............ 704/273 |
| 6,233,556 B1 | | 5/2001 | Teunen et al. |
| 6,496,800 B1 | | 12/2002 | Kong et al. |
| 6,510,415 B1 | | 1/2003 | Talmor et al. |
| 6,535,582 B1 | | 3/2003 | Harris |
| 6,691,089 B1 | * | 2/2004 | Su et al. ..................... 704/244 |
| 6,728,677 B1 | | 4/2004 | Kennan et al. |
| 6,876,964 B1 | * | 4/2005 | Shiomi et al. ............. 704/202 |

FOREIGN PATENT DOCUMENTS

| CA | 213211 C | 5/2004 |
| EP | 1096473 A2 | 5/2001 |
| EP | 1096474 A2 | 5/2001 |

* cited by examiner

Primary Examiner—Vijay Chawan
Assistant Examiner—Thomas Shortledge
(74) Attorney, Agent, or Firm—Edward Langer, Pat. Atty; Shiboleth, Yisraeli, Roberts, Zisman & Co.

(57) ABSTRACT

A system for verifying and enabling user access, which includes a voice registration unit for providing a substantially unique and initial identification of each of a plurality of the speaker/users by finding the speaker/user's voice parameters in a voice registration sample and storing same in a database. The system also includes a voice authenticating unit for substantially absolute verification of an identity of one of said plurality of users. The voice authenticating unit includes a recognition unit for providing a voice authentication sample, and being operative with the database. The voice authenticating unit also includes a decision unit operative with the recognition unit and the database to decide whether the user is the same as the person of the same identity registered with the system, such that the identity of one of the plurality of users is substantially absolutely verified.

55 Claims, 13 Drawing Sheets

METHOD AND SYSTEM FOR VERIFYING AND ENABLING USER ACCESS BASED ON VOICE PARAMETERS

CROSS-REFERENCE TO RELATED APPLICATIONS

The present application is a continuation-in-part of pending U.S. patent application Ser. No. 10/288,579, entitled "System and a Method for Transacting E-Commerce Utilizing Voice Recognition and Analysis", filed 6 Nov. 2002, by the same assignee; and is a continuation-in-part of pending PCT patent application number PCT/ILO3/00388 designating the United States, entitled "A System and a Method for Conducting Secure, Voice-Based, E-Commerce Transactions Over a Telecommunications Device", filed 14 May 2003, and claims priority of Provisional Patent Application 60/598,543, entitled "Method and System for verifying and enabling user access based on voice parameters", filed Aug. 4, 2004, the contents of all of which are hereby incorporated by reference.

FIELD OF THE INVENTION

The present invention generally relates to providing secure, voice-based access, and more particularly, to a method and system for registering and verifying secure, voice-based access for a range of activities and transactions.

BACKGROUND OF THE INVENTION

On Jun. 30, 2000, Federal law enacted the use of authenticated digital signatures as legally binding, especially for E-Commerce. The present Public Key Infrastructure (PKI) has utilized digital certificates with encryption code as authenticated digital signatures for external point-to-point electronic transaction/transmission. To complete the secured transmission, internal authenticated digital signatures are required of the personnel authorized to use these digital certificates. Personnel authentication must first be established, especially for remote authorization of the PKI.

Digital signatures require an uncompromisable (non-digital, biometric) core to authenticate the actual operators of PKI established transmissions for the PC/telephony infrastructure of our insecure digital world, as well as for in-person verification. Typically, cards having a coded magnetic strip are used, and these and the access codes enabling their use have to be distributed in advance.

Various biometric authentication methods which have been used, such as fingerprinting and iris or retinal scans, are difficult to implement as they require special hardware, and they can make people feel uncomfortable, or can even transmit illness. But, most importantly these methods have not proven to be accurate enough for absolute identification.

The human voiceprint, comprising the amplitudes of each frequency component, and being both non-digital and non-intrusive, is ideally suited for authentication purposes given its worldwide usage, within an already existing communications infrastructure, including wireless. With the ever present utilization of telephones and microphones, voice authentication or verification, also known as speaker recognition, is a natural, and certainly most cost-effective, evolution of technology which can be utilized from anywhere, at anytime.

In a paper entitled Nonlinear Speech Processing Applied To Speaker Recognition, Marcos Fandez-Zanuy points out that speaker recognition has many applications including voice dialing, banking over the telephone, security controls, forensic systems and telephone shopping. This has raised a great interest in improving the current speaker recognition systems. A key issue is the set of acoustic features extracted from the speech signal. This set is required to convey as much speaker dependent information as possible. The standard methodology to extract these features from the signal uses either filter bank processing or linear predictive coding (LPC). Both methods are, to some extent, linear procedures and are based on the underlying assumption that acoustic characteristics of human speech are mainly due to the vocal tract resonances, which form the basic spectral structure of the speech signal.

However, human speech is a nonlinear phenomenon, which involves nonlinear biomechanical, aerodynamic, acoustic and physiological factors. LPC-derived parameters can only offer a sub-optimal description of the speech dynamics. Therefore, there has been a growing interest for nonlinear models applied to speaker recognition applications. Speech signals are redundant and non-stationary in nature. LPC coding schemes take advantage of the redundancy, but do not offer a way to account for non-stationarity, and for nonlinear redundancies such as the fractal structure of frication, sub-harmonics in the voice source and nonlinear source tract interaction.

Therefore, further investigations are needed to identify the appropriate acoustic features. All agree that new, time-frequency representations, both acoustical and perception-based, are needed. Moreover, since the human decoding of the speech signal is based on decisions in narrow frequency bands processed independently from each other, sub-band processing techniques have not yet been exploited, such as feature extraction algorithms. Time dependent and multi-time dependent fractal dimensions, as well as Lyapunov exponents and dimension and metric entropy in phoneme signal, which have been mostly used for speech recognition applications, have not yet been modified for speaker recognition, using combinations of these features.

Voice (or speaker recognition or) verification is to be distinguished from voice identification, the latter being a tougher problem and at present the existing technology does not provide an adequate solution. Voice verification, on the other hand, is easier because the decision to establish the voice's authenticity is essentially binary in nature. In voice verification, it is principally determined whether the individual is who he claimed to be based on his utterance.

There are two approaches to voice verification, text dependent and text independent. In the text dependent approach, the user utters the same text (with possible variations on the order of the words constituting the text) whereas in the text independent approach, the user is not constrained to a single text or aggregation of words and can utter arbitrary text. The text independent approach, while having the advantage of user friendliness, requires extensive training and the performance is not satisfactory for practical applications.

In typical text dependent voice verification scenarios, the user registers a phrase by repeating it many times, and when he wishes to verify he utters the same phrase. The system examines the phrase uttered during the registration phase, collects information regarding the spectral and temporal manner of the phrase utterance, and deduces whether the phrase uttered during verification, possesses similar characteristics. Ultimately the success (or failure) of the process critically depends on user acceptance and user friendliness. One postulates the following axioms for making the voice verification process easier for the common person: the system should learn along with the user and adapt itself for harmonious performance.

There are two principal approaches to dependent text voice verification, namely Dynamic Time Warping (DTW) and Hidden Markov Modeling (HMM). The DTW approach was developed during the 1970's, predominantly by Texas Instruments (Doddington's group based on his doctoral dissertation on verification) breaks the utterance into feature vectors, and finds scores between utterances by matching these feature vectors. During this pattern matching, it will stretch or contract speech segments (within certain constraints) for maximal scores and uses an optimization principle called Dynamic Programming expounded by Bellman during the 1960's. The feature vector representing the initial utterance may or may not be updated by the next utterance (referred to as "smoothing") based on the inter-utterance scores and the system discipline. Some verification systems may keep a cluster of feature vectors for each user whereas other systems may maintain only one feature vector.

The related field of speech recognition (recognizing the content of what is said, as opposed to who is saying anything) has traditionally used feature vectors comprising four or five dimensions, but because accuracy is not as important as in speaker recognition, a greater number of dimensions has not been applied. Because the task of speech recognition can tolerate a lower accuracy than that required for speaker recognition, the prior art has heretofore not applied feature vectors having added dimensions.

Nature exhibits chaotic, seemingly random behavior with an underlying, but unpredictable order. Fractals are objects with fractional dimension. They show self-symmetry as the scale is changed. In evaluating a shape (e.g., for a voiceprint frequency spectrum), it is often desirable to find the capacity dimension of the shape. A line is one-dimensional, a filled square is two-dimensional, and a cube is three-dimensional. Fractal geometry concerns objects whose capacity dimension is fractional rather than integer. For example, four unit squares can fill a 2-by-2 square, where the unit squares are one-quarter sized identical copies of the 2-by-2 square. Recursively, each unit square can be precisely filled with four squares $\frac{1}{16}$ the size of the original 2-by-2 square, etc. In nature, a fern is a fractal, where each branch and sub-branch, etc., are a small fractional reproduction of the overall fern. The fractal signal model often can be applied for signals used for spectral and expressive control of the voice.

The set of states that a chaotic system visits, turns out to be a fractal. Dimension is a measure of irregularity. Scaling behavior of various quantities can be exploited to define dimensions, and chaotic attractors typically have a non-integer dimension. Likewise, attractors in dimensions are a quantitative characterization of the attractor. Lyapunov Exponents, $\lambda$ are useful to describe the stability properties of trajectories. A positive Lyapunov exponent is an indication of the presence of chaos, since for $\lambda>0$, sufficiently small deviations from a trajectory grow, and it demonstrates a strong instability within the attractor. The inherent instability of chaotic systems implies limited predictability of the future if the initial state is known with only finite precision. Therefore, with the aid of attractor dimension and the Lyapunov exponent, chaos can be distinguished from noise.

In U.S. Pat. No. 6,510,415, to Talmor, dated Jan. 21, 2003 (filed 15 Mar. 2000), the inventor focuses on voice authentication algorithms. The system uses a voiceprint made in real-time to compare against stored voiceprints from a database of users. Access for a user of the system is only permitted on a one-time basis, if the fit is "most similar". Talmor teaches the techniques of Cepstrum calculation and Linear Time Warping. Cepstrum calculation is a standard prior art parse, which uses constant/personal parameters, while doing calculations on user voices.

The Linear Time Warping approach of Talmor is a form of optimized, weighted DTW and can also be applied to HMM or Gaussian Mixture Model (GMM). This involves finding the optimum path, which involves calculated parameters. Primarily this patent addresses the voiceprint matching problem using voice features that are distinctive and which most closely characterize and thus identify a speaker, but does not provide the details of the algorithm Talmor uses.

In U.S. Provisional Pat. No. 20030135740 dated Jul. 17, 2003 (filed Oct. 2, 2003) entitled "Biometric-based System and Method Enabling Authentication of E-messages Sent over a Network", Talmor addresses the problems of PKI encryption using voiceprint analysis and comparison of voice prints to stored data. The patent describes the use of digital signatures, secure on-line transactions and secure messaging, as part of the system of the invention. Biometric data, including palm prints, finger prints, face prints, and voiceprints, become the private keys when utilizing a PKI system of authentication. The biometric-based system of the invention provides a web-server with a three-tier security structure: (1) biometric sample; (2) unique device ID, and (3) a PIN. Again, there is no disclosure of voiceprint authentication details.

In U.S. Pat. No. 6,535,582, Voice Verification System, Harris discloses a plurality of interactive voice response (IVR) units connected to a verification server. The technology generally relates to the network layers and connections based on the internet, with an API module. Accordingly, there are no mathematics or innovative workings disclosed.

In Canadian patent CA2130211C, System and Method for Passive Voice Verification in a,Telephone Network, Bahler, et al, disclose verification of an identity that is derived from thecustomer calling card. The technical innovation and accuracy provided are minimal.

In U.S. Pat. No. 6,496,800, Speaker Verification System and Method Using Spoken Continuous, Random Length Digit String, Kong and Kim teach the use of passive voice verification in a telephone network-passively monitoring a conversation between calling and called parties to obtain a sample signal, and comparing with at least one reference set of speech features to determine whether calling party is a customer of a telephone network. The invention makes use of thresholds for establishing security. There are no details about the algorithm or the elements of the component blocks.

Kannan, et al, in U.S. Pat. No. 6,728,677, discloses a Method and System for Dynamically Improving Performance of Speech Recognition or Other Speech Processing Systems. The invention provides a speech recognition performance improvement method involving monitoring utilization of computing resources in a speech processing system, based on which performance of speech processing operations is improved. In U.S. Pat. No. 6,233,556, Teunen teaches A Voice Processing and Verification System. This patent discloses a voice processing method for automatic and interactive telephone systems, involves transforming an enrollment speech model to corresponding equipment type for incoming user speech. No details are provided in either of these two patents assigned to Nuance, Inc.

In European patent No. EP1,096,473A3 assigned to Persay, Background Model Clustering for Speaker Identification and Verification, Toledo-Ronen discloses the target likelihood score of an unknown speaker, which measures the degree to which the input speech of the unknown speaker matches the model of a target speaker. The method normalizes the target likelihood score and includes the step of selecting one of a plurality of background models as a selected background model. The method also includes the steps of measuring the degree to which the input speech matches the selected background model, thus producing a background likelihood score, and dividing the target likelihood score by the background likelihood score.

Therefore, there is a need to utilize combinations of time dependent and multi-time dependent fractal dimensions, FFT, Lyapunov exponents and other non-linear techniques for speaker verification systems.

SUMMARY OF THE INVENTION

Accordingly, it is a principal object of the present invention to verify and enable users for access to a wide range of activities and sites.

It another object of the present invention to provide an improved method and system for registering and authenticating secure, voice-based, e-commerce transactions over a telecommunications device utilizing a voice verification algorithm.

It is a further object of the present invention to provide a uniquely powerful method and system for voice registration, which finds the speaker's voice parameters.

It is yet a further object of the present invention to provide a method and system for voice registration involving three major steps: fractal analysis, spectrographic analysis and determination of the Lyapunov exponents.

It is still a further object of the present invention to perform fractal analysis, wherein the raw data is investigated and each sample gives a set of non-dimensional numbers which characterize a speaker's voice uniquely.

It is one further object of the present invention to introduce a vector having sixteen (16) dimensional voice features, which is the key index for the verification.

It is yet another object of the present invention to improve identification and prevent theft and fraud perpetrated by stealing a person's voice.

It is one more object of the present invention to perform a spectrographic analysis, wherein the raw data is investigated and generates a uniquely identifiable pattern, similar to a finger print, with substantially unambiguous accuracy.

It is yet one more object of the present invention to provide improved security for global transactions, irrespective of place, time and with whom one is doing the transaction.

In accordance with a preferred embodiment of the present invention, there is provided a system for verifying and enabling user access, which includes a voice registration unit for providing a substantially unique and initial identification of each of a plurality of the speaker/users by finding the speaker/user's voice parameters in a voice registration sample and storing same in a database. The system also includes a voice authenticating unit for substantially absolute verification of an identity of one of the plurality of users. The voice authenticating unit includes a recognition unit for providing a voice authentication sample, and being operative with the database. The voice authenticating unit also includes a decision unit operative with the recognition unit and the database to decide whether the user is the same as the person of the same identity registered with the system, such that the identity of one of said plurality of users is substantially absolutely verified.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which.

DETAILED DESCRIPTION OF A PREFERRED EMBODIMENT

The present invention has two phases of operation: voice enrollment or registration and voice authentication, also known as voice verification. During voice registration the object is to find the speaker's voice parameters. Voice registration involves three major steps: fractal analysis, spectrographic analysis and determination of the Lyapunov exponents. During fractal analysis, the raw data is investigated and each sample gives a set of non-dimensional numbers which characterize the speaker voice uniquely.

During spectrographic analysis the raw data is investigated and generates a unique pattern, similar to a finger print. This allows extraction of geometrical characteristics relative to the speaker's voice. Finally, the Lyapunov exponents involve computation of a spectrum of exponents, which characterize the voice registration sample uniquely.

Mathematically, sound is represented as a sequence of values, forming a temporal series. There are several techniques to extract features of time series, among them the classical Fast Fourier Transform (FFT), and more recently, the Fractal Dimension and Lyapunov exponents. Through these techniques it is possible to analyze the original sound waveform, without the necessity to individually analyze each one of the points of the time series.

The waveform of a sound is a set of n couples (amplitude $A_n$, frequency $f_n$) which leads to a multidimensional representation of timbre. Additionally, the spectral envelope of the series $A_n$ carries a lot of information in the case of the voice. Any lack of stationarity exhibited by the signal will lead to some energy between the major frequency components, which will automatically be assimilated as an additive noise. Sounds only come to life when they start exhibiting modulations or peculiar transitional stages. In a way, it is their deviation from pure stationarity, however small, that provides sounds with their identity, and thereby they become identifiable and voices become verifiable.

The growth of entropy, with an increasing resolution, is related to the attractor's dimension. Indeed, if the embedding dimension is large enough, then the object will measure the dimension of the set of the system's solution, i.e. the dimension of the set corresponds to the attractor's dimension if the system were deterministic.

In the case of non-linear models, local linearization around any relevant point on the prediction surface will lead to a similar (but local) matrix form. Averaging sorted eigenvalues of these local matrices along the relevant points of the prediction surface (i.e. observed data) leads to the definition of the Lyapunov Exponents.

The following discussion provides details of the voice authentication phase. However, most of the technical steps are repetitive of all the corresponding steps in the preceding voice registration phase.

Figure 1:
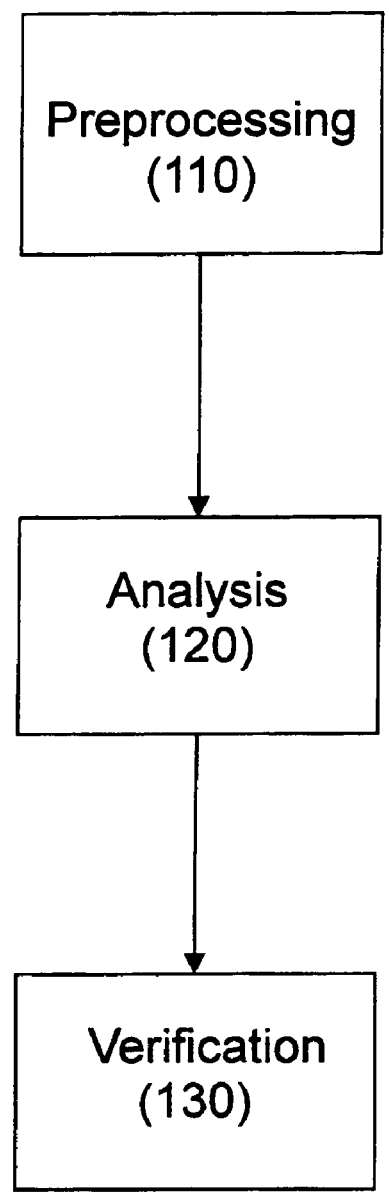
FIG. 1 is a general flowchart of the Preprocessing, Analysis and Verification phases of the present invention.

With reference now to FIG. 1, there is shown a general flowchart block diagram for voice authentication in accordance with the present invention, including three phases: preprocessing 110, analysis 120 and verification 130. Preprocessing block 110 involves cleaning, filtering and universalizing (standardizing) the voice signal. Analysis block 120 is a digital signal processing unit for implementing a fast Fourier transform (FFT) to optimally resolve the voice frequency waveform into its constituent pure tones, each present at a particular amplitude, or loudness. Verification unit 130 is a signal verification unit, which interacts with a database and the input voice signal.

In acoustics, the signal is the fluctuations in pressure which exist in the path of a sound wave. The Fourier transform of this signal effectively breaks down the sound into pure tones as recognized by musicians as a note of definite pitch. The Fast Fourier Transform is simply a method of laying out the computation, which is much faster for large values of N, where N is the number of samples in the sequence. The idea behind the FFT is the "divide and conquer" approach, to break up the original N point sample into two (N/2) sequences.

Figure 2:
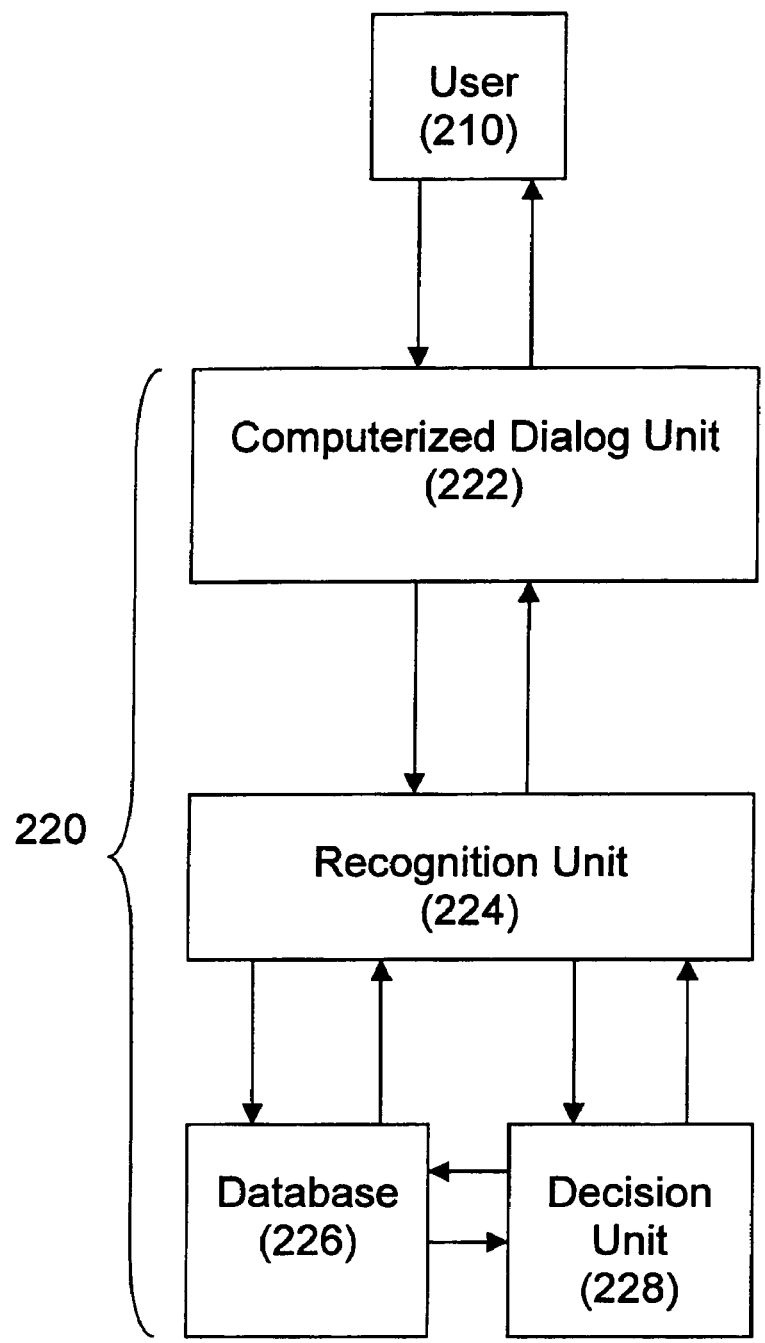
FIG. 2 is a block diagram of the General Authentication Process of the present invention.

FIG. 2 is an exemplary block diagram of the present invention. The voice verification algorithm of the present invention involves development of a constant parameter K, which is unique to the voice of a particular user 210, and which gives substantially 100% recognition capability. The voice remains constant, even though it may sound different with aging, illness, attempts at disguise or unnatural origination (e.g., over the telephone or the use of a recording, the latter, in particular, being distinguishable by the present invention). From when the first word is recorded by the voice registration system, there is a certain harmonic content that stays the same. However, the harmonic frequencies of the voice change on a slow continuum as user 210 ages. During each authentication encounter, the system automatically learns and adapts to this continuous change, enabling the system shorten the verification process needed at any time.

The information used by the algorithm is taken from the frequency spectrum of the voice, but it is not only frequency analysis. The basic idea is that the constant parameter K is extracted from the voice of user 210, which becomes his identification, and can be used for all the purposes that the system needs, to be sure that a certain voice is recognized. The development of this constant parameter K to an accuracy of fifteen decimal places is a major element of the present invention.

The present invention uses the MFCC (Mel Frequency Cap coefficient) to establish the constant voice parameter K, associated with user 210. An object of type MelFilter represents an acoustic time-frequency representation of a sound: the power spectral density P(f, t), expressed in dB's. It is sampled into a number of points around equally spaced times, $t_i$ and frequencies, $f_j$ (on a Mel frequency scale). A command creates an MFCC object from every selected sound object. The analysis proceeds in two steps:

1. Perform a filter bank analysis on a mel frequency scale; and
2. Convert the filter values to mel frequency cepstral coefficients Once the system has that unique voice parameter K, it can choose user 210 from any other speaker and substantially identify him with absolute certainty. The voice verification algorithm of the present invention obtains the voice parameter K, and uses an equation (shown below) defining M as the number of users already registered in the system. Small m is the index of particular user 210, and j represents the number of tests that need to be done in order to achieve the desired accuracy.

In the analysis of the voice of user 210, the system uses vector notation to represent the parameters defining his voice and j is the sum of all the vectors representing that voice.

The procedure of the analysis begins as follows. When the system begins in the first stage, the answer to a question known as A is analyzed and the appropriate factor or constant is built. The factor is defined according to the different tests that the system provides for the answer.

In the process of identification, user 210 typically begins by saying his family name, and the system focuses on the relevant categories in the database of information for this answer. The answer chosen is the one that is the closest to one previously registered, so if it is a family name, the category of the family name is now chosen from the database to see which one is closest to it, in terms of waveform analysis, as detailed in the flowcharts of FIGS. 4–7 below. The items which are found as the closest to the answer are given a rating.

If the first answer has been analyzed, and it only matches one individual in the database, then a decision can be made already. If the database is able to identity one individual, it is because that individual family name itself has a unique phonetic pronunciation. When it is pronounced a particular number is generated, which is matched by the database, and deterministically, one can say it's the exact same individual.

If the analysis of the first answer does not produce a single result, the system has not achieved its goal of identifying the speaker, therefore, another question is asked and the voice parameters become more specific. Each of these voice parameters reduces the number of items that can be matched by a factor of ten (10). The number of questions required to deterministically arrive at identification with absolute certainty depends on the size of the database.

At the end of this loop, one arrives at a single item for which the rating is the lowest, i.e., the best answer, which is less than the margin of error, defined as epsilon ($\epsilon$).

wherein $\epsilon = \frac{1}{2}M$.

Thus, $\epsilon$ is the inverse of twice the size of the database. That is to say, if there are 100 people in the database, then 1 over 200 is the margin of error. Therefore, the number of questions asked by the system is related to the margin of error.

$$M_j^m = M_{j-1}^m \cdot f,$$

where $f = \epsilon^{1/N_q}$, $N_q$ is the number of questions asked for positive identification.

The general authentication block diagram of FIG. 2 shows a user 210 and a verification system 220, including a computerized dialog unit 222, a recognition unit 224, a database 226 and a decision unit 228. User 210 begins a connection in-person, or by phone, mobile phone or even a regular phone, depending on the application, as illustrated by FIGS. 8 to 13 hereinbelow. The dialog between user 210 and a call center is performed by computerized dialog unit 222. Computerized dialing unit 222 connects user 210 to recognition unit 224

In general terms, the verification is done in an interactive fashion, such that system 220 asks user 210 to say some of his characteristics, general or personal. The identification is done in stages, wherein system 220 proceeds in order to decide whether user 210 is the same as the person of that identity registered in the system.

System 220 is also supposed to detect whenever user 210 is not registered in the database 226 of system 220. Thus the identification process fails, and user 210 is directed to register with the system. The system also knows to allow the user a second chance, in any case where the identification fails, or in the case that the decision is borderline. In this case, the system asks the user to provide additional characteristics, or to repeat some of them, and if there is progress the identification can succeed.

In an exemplary case, where there is no success of identification, the system allows a complete repetition of the process. If the identification on the second try is also unsuccessful, the system blocks the user from trying to continue, and the system provides a notation of the attempt by this particular user, and in some applications a warning or alarm may be issued. If there is a successful identification, a notation is provided in the system, and the system learns about this user as one who has succeeded in being identified. This allows the system to follow-up after this user, and assists the system to learn about his movements and habits, so that in the future additional identifications are done more quickly and there is a reduction of false identifications because of insufficient information.

Figure 3:
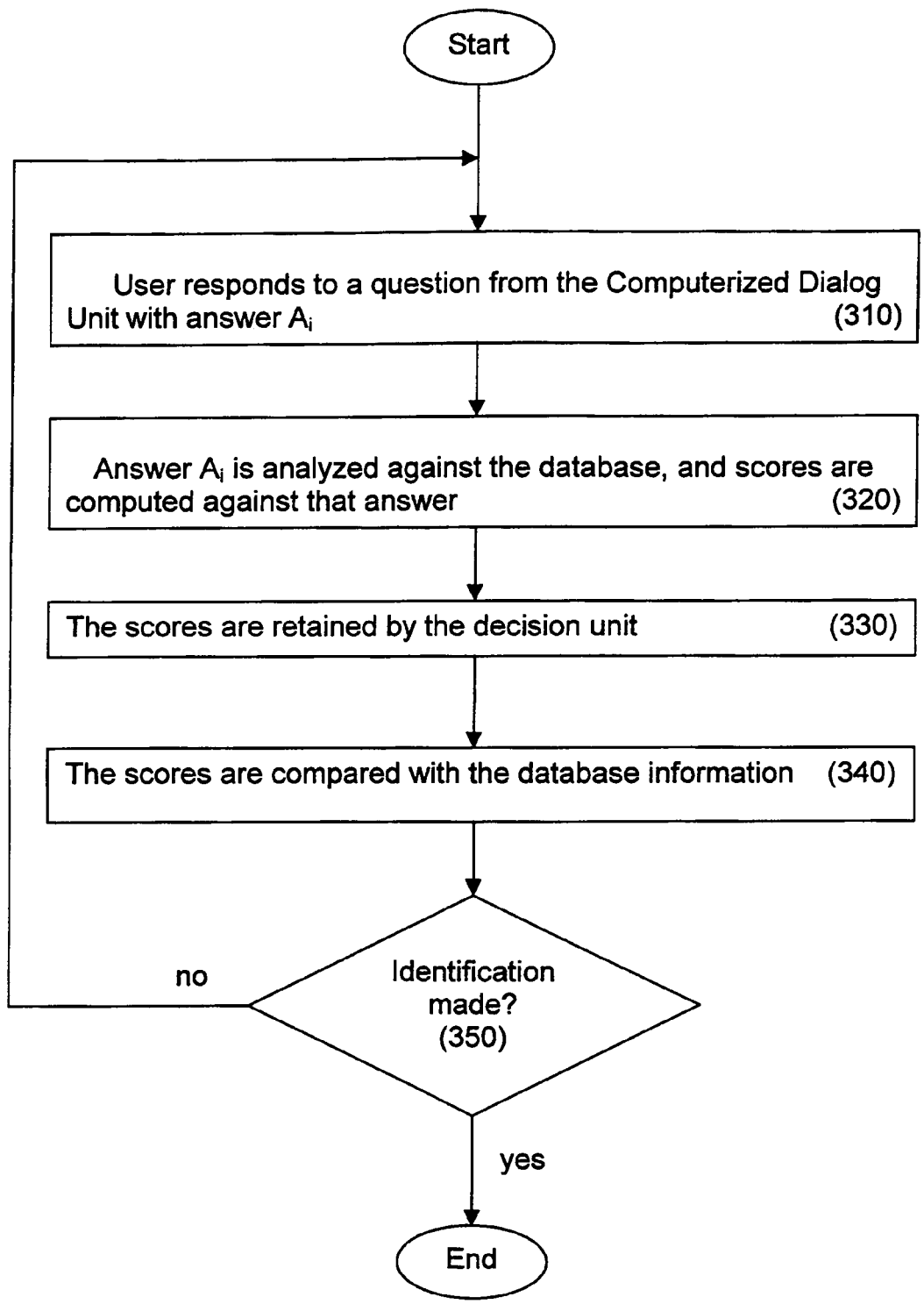
FIG. 3 is a flow chart of the Recognition Unit of FIG. 2, constructed in accordance with the principles of the present invention.

FIG. 3 is a flowchart of the interactive processing of the Recognition Unit of FIG. 2, constructed in accordance with the principles of the present invention. The process begins in block 310, with the user responding to the computerized dialog unit by answering a question with answer $A_i$. The answer $A_i$ is then analyzed relative to the database and scores are computed against that answer in block 320. The scores are retained by the decision unit in block 330, which then compares those scores with the database information in block 340. Then the loop continues with the computerized dialog unit asking further questions to which the user responds, so that the process can proceed until there is a positive response so that identification can be made in block 350.

The repetition of the process by the system, with additional questions, provides additional levels of security which are called 'tiers', i.e., additional tiers of security in the system. The above process describes two rounds of questioning, i.e., a first and second tier.

The third tier uses the voice that is being analyzed to "internally" self-analyze the voice, by comparing segments of the voice that is in that same conversation, with itself, and with the database. In the fourth tier, the system recognizes changes within the harmonic frequencies between different voices, so that if the voice that began the conversation is no longer continuing, there may have been something improper, and therefore the system will recognize this situation.

Figure 4:
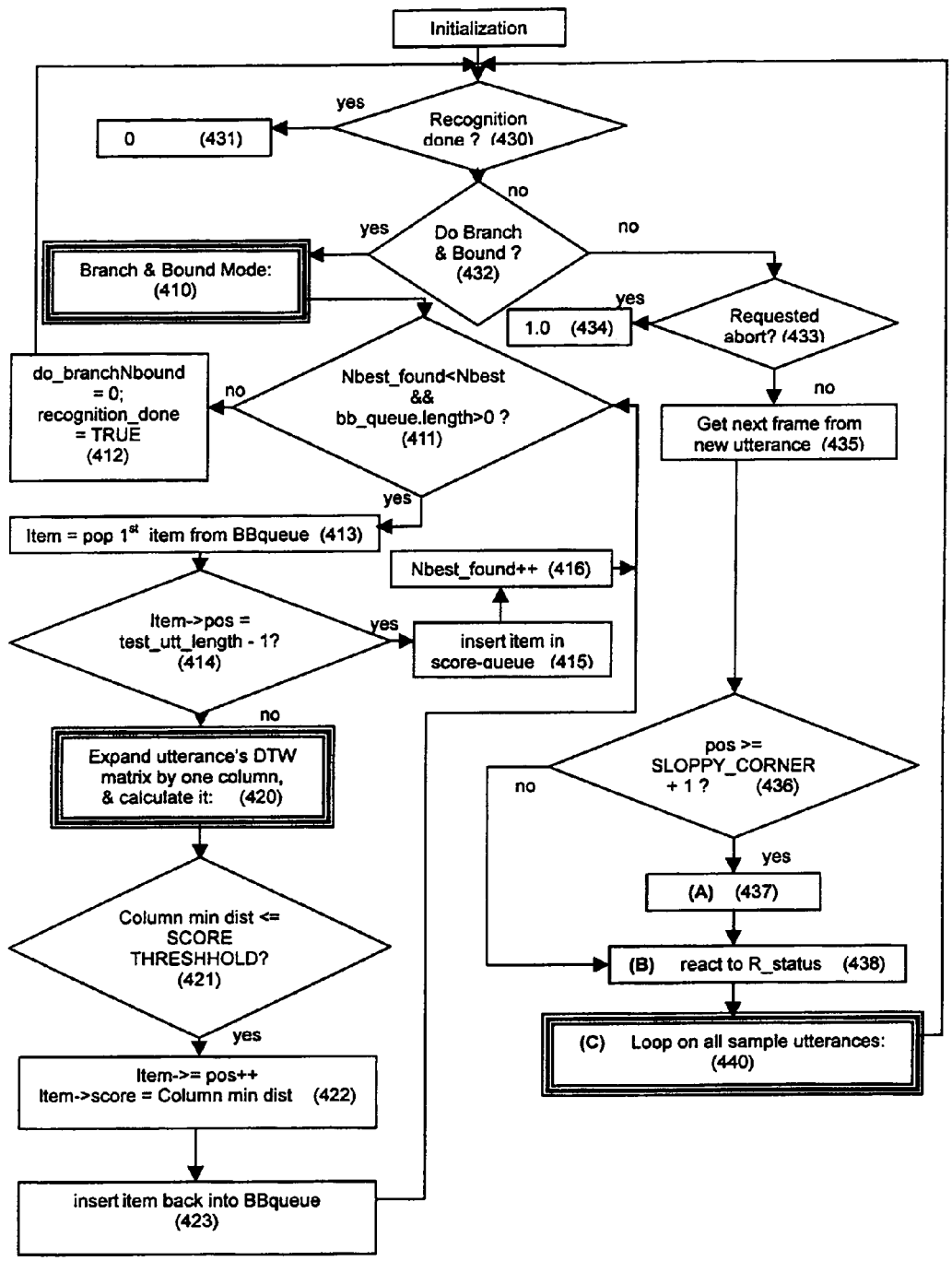
FIG. 4 is a flowchart of an Authentication algorithm, constructed in accordance with the of the present invention.

FIG. 4 is an overall general authentication flowchart, constructed in accordance with the principles of the present invention. FIGS. 4–7 are a set of flowcharts containing expressions, which will be understood by a programmer skilled in the art. The flowcharts may be implemented in a microprocessor, executable by a suitable programming language, such as C++. Each heavily outlined reference block represents a general "header" for the blocks that follow, such as blocks 410, 420 and 440. Block 437 continues and is expanded at the top of FIG. 5, including blocks 520–523. Block 440 continues and is expanded at the bottom of FIG. 5, starting in block 525, and then continues in FIG. 6, in block (D). As such, "Loop on all sample utterances" (block 440) is a general header that includes "Loop on each sample utterance" (block 525), with an exit at "Last sample utterance?" (block 535) to (D) "Further loop on each sample utterance" (block 600 in FIG. 6).

The system operation may be initiated when a call is made, for example, wherein the user may be asked a series of questions. For each answer the user may utter, a "branch and bound" loop is performed in block 410. The branch and bound algorithm cuts the interval in two, and is applied herein, similarly to D'haes W., et al, in the paper, "An efficient branch and bound search algorithm for computing K nearest neighbors in a multidimensional vector space", IEEE, Gent, Belgium, Sep. 9–11, 2002, paraphrased as follows:

Searching the N nearest neighbors in a multidimensional vector space is a technique used for non-parametric density estimation and classification. When the number of samples is large, various techniques reduce the number of distance computations. In order to obtain an efficient decomposition of the sample, the following assumptions are made:

1. each subset preferably contains an equal number of vectors; and 2. the number of vectors that have nearest neighbors in both subsets is minimized.

First, a multivariate gaussian is fit to the set. Then, the vectors are divided into two subsets, according to the hyperplane containing the mean vector and perpendicular to the eigenvector of the covariance matrix with the largest eigenvalue. It is shown that this decomposition is optimal for a multivariate gaussian distribution. Since any hyper-plane containing the mean vector divides the distribution in two equal halves, the first efficiency criteria is automatically fulfilled. When considering a continuous distribution as a sampling with an infinite accuracy, only vectors that lie exactly on the hyper-plane have nearest neighbors in both subsets. Therefore, to determine the hyper-plane for which the integral of the distribution over that plane is minimal.

The steps of the branch and bound loop are represented by blocks 411 through 416. A major sub-loop within the branch and bound loop is a column-wise expansion of the utterance's dynamic time warping (DTW) matrix 420. The steps of the column-wise expansion include blocks 421 through blocks 423. This involves a fast Fourier transformation (FFT) to the time domain. The FFT divides the user voice frequency waveform into two-hundred and fifty-six (256) "bins", which enable a detailed analysis of the voice features.

The DTW approach, as repeated here from the Background for clarity, breaks the utterance into feature vectors, and finds scores between utterances by matching these feature vectors. During this pattern matching, it will stretch or contract speech segments (within certain constraints) for maximal scores and use an optimization principle called Dynamic Programming. The feature vector representing the initial utterance may or may not be updated by the next utterance (referred to as "smoothing") based on the inter-utterance scores and the system discipline. The feature vector of the present invention has sixteen dimensions (16). Thus, the 256 bins are allocated to 16 filter "banks", such that each filter bank is classified by the feature vector, thereby enabling a highly accurate verification of the user voice.

It has been found that, in accordance with the present invention, 16 dimensions is the necessary and sufficient number for substantially absolute voice verification.

Further answers are analyzed, if necessary, by looping on all sample-utterances, as shown in block 440, until recognition is done in block 430. If recognition is not done, and the branch and bound loop (block 432) is not done, the subsequent steps include blocks 433 through 440. The main decision here, as represented in block 436, is whether "pos>=SLOPPY_CORNER+1?" If yes, the system goes directly to (A) 437, which is detailed in the top of FIG. 5, and then goes to (B) and then (C). If not, the system goes to (B) in block 438 "react to R_status", which is detailed in the bottom of FIG. 5, and then (C) the looping on each sample-utterance, as represented in block 440, continues, as introduced and generalized in FIG. 6, and detailed in FIG. 7, as (C1), (C2) and (C3). "Pos" refers to the pointer position at the start of the sampling process.

SLOPPY_CORNER refers to the start of the search for finding the minimum. This concept was introduced above with reference to FIG. 1 as "divide and conquer".

Figure 5:
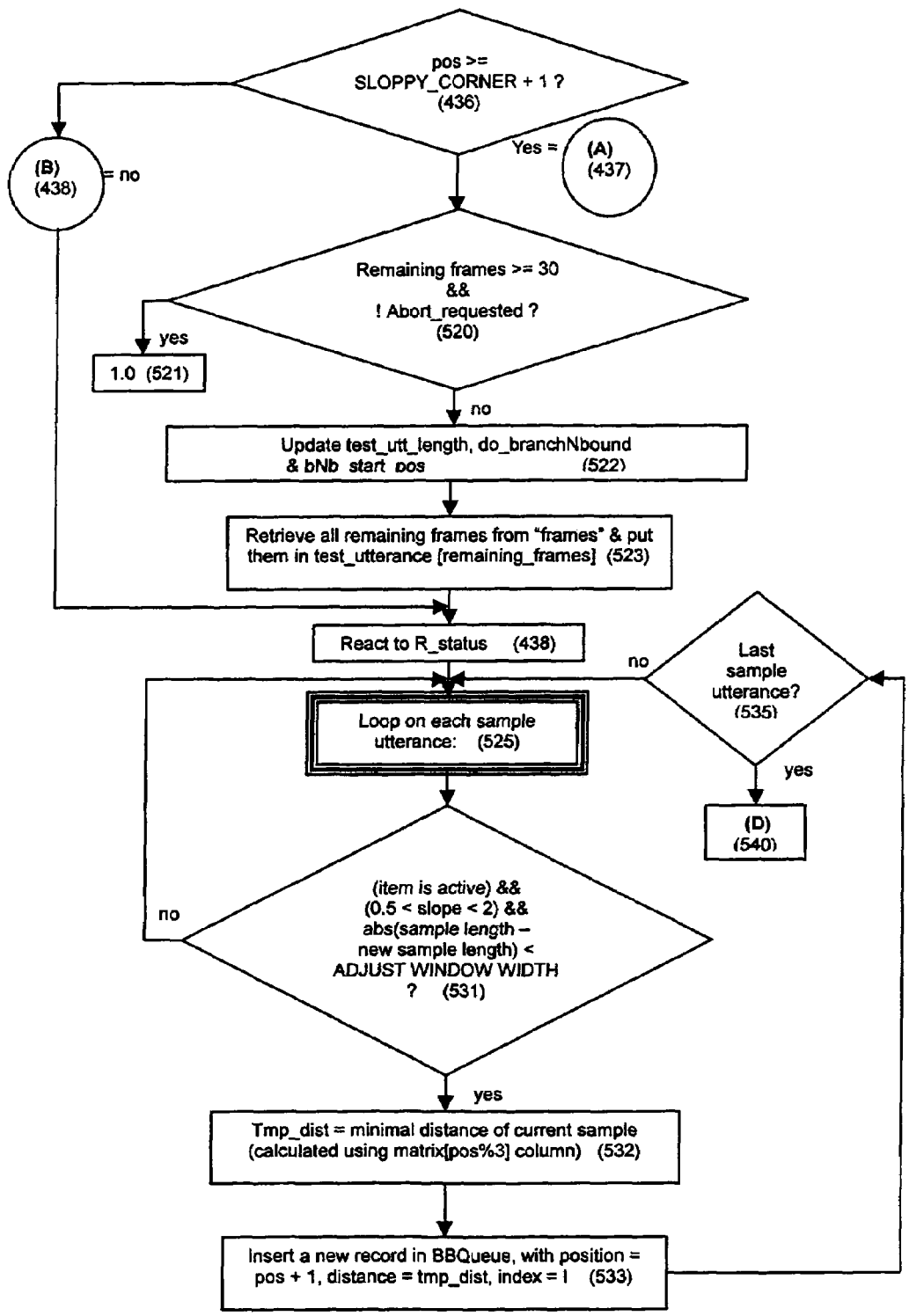
FIG. 5 is a segment of the flowchart of FIG. 4, showing details of the Preprocessing to the Loop of All Sample Utterances.

FIG. 5 is a segment of the flowchart of FIG. 4, showing details of the preprocessing to the loop on each sample utterance 440. The main decision block "pos>=SLOPPY_CORNER+1?" 436, is repeated from FIG. 4 and expanded upon. If yes (A) 437, then the system asks are the "Remaining frames>=30 && !abort_requested?", as represented in block 520, and continued in blocks 521 through 523. If no, then the processing on each sample utterance continues in (B) "react to R_status", 438, and then an expansion of block 440 is shown in blocks 531 through 533. Then the "Loop on each sample utterance" continues, as detailed in FIG. 6 below.

Figure 6:
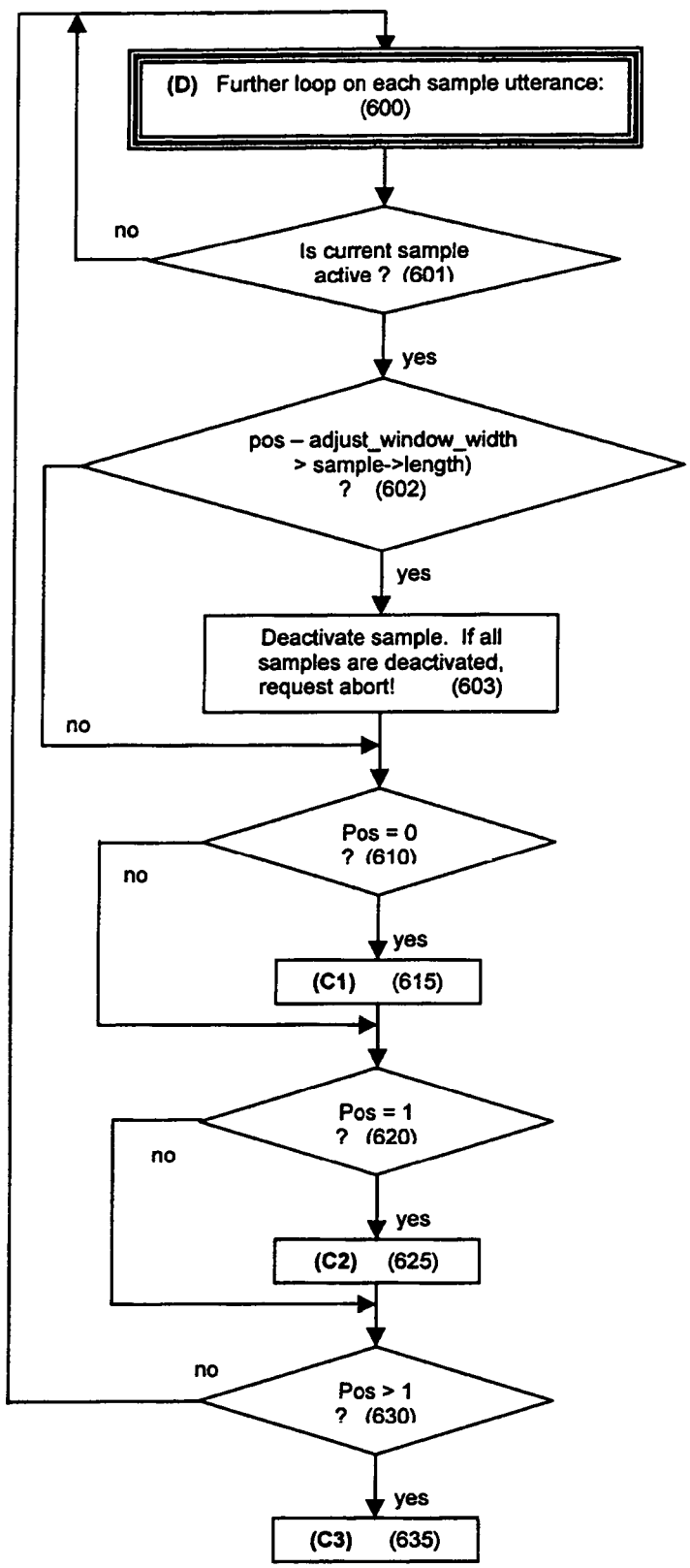
FIG. 6 is a segment of the flowchart of FIG. 4, generally showing the Loop of All Sample Utterances.

FIG. 6 is a segment of the flowchart of FIG. 4, showing greater details of the Loop on each Sample Utterance in block 430, as shown in blocks 601 through 635. Separate processing is indicated for three possible results of Pos: Pos=0 (C1), as represented in block 610; Pos=1 (C2) 620; and Pos>1 (C3), as represented in block 630, each of which is further elaborated in FIG. 7 below.

Figure 7:
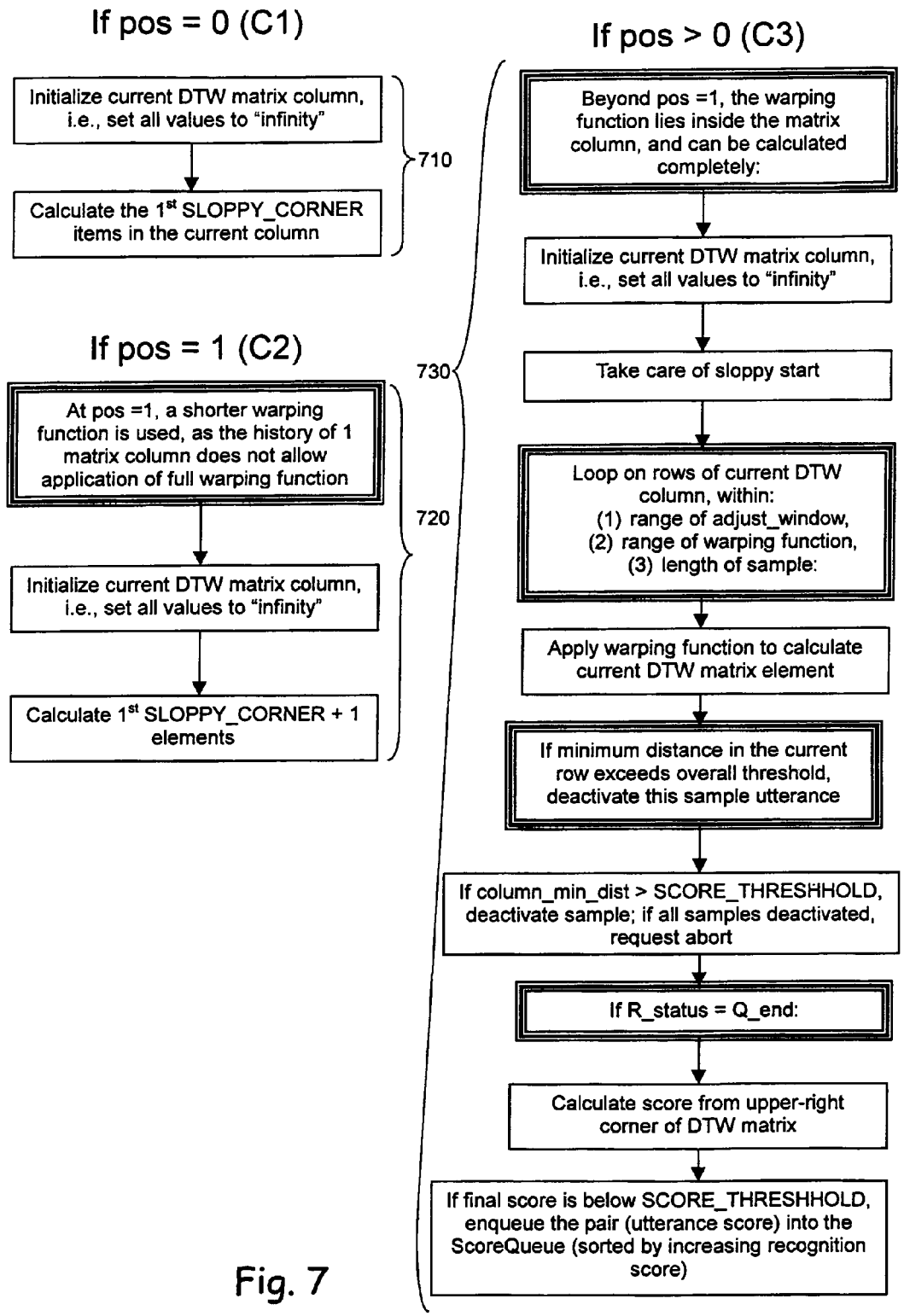
FIG. 7 is a segment of the flowchart of FIG. 4, showing details of the Loop of All Sample Utterances.

FIG. 7 is a segment of the flowchart of FIG. 4, showing separate details of the Loop on each Sample Utterance. For Pos=0 (C1), initialize current DTW matrix column, i.e., set all values to "infinity", and calculate the 1st SLOPPY_CORNER items in the current column in blocks 710 and 715. For Pos=1 (C2), a special (shorter) warping function is used, because the history (of only one matrix column) does not yet allow for the application of the full warping function. Thus, again the current DTW matrix column is initialized, i.e., set all values to "infinity", and in this case calculate the 1st SLOPPY_CORNER+1 elements in blocks 720, 721 and 722.

For Pos>1 (C3), the warping function lies inside the matrix, and can be calculated completely in blocks 730 through 739.

Figure 8:
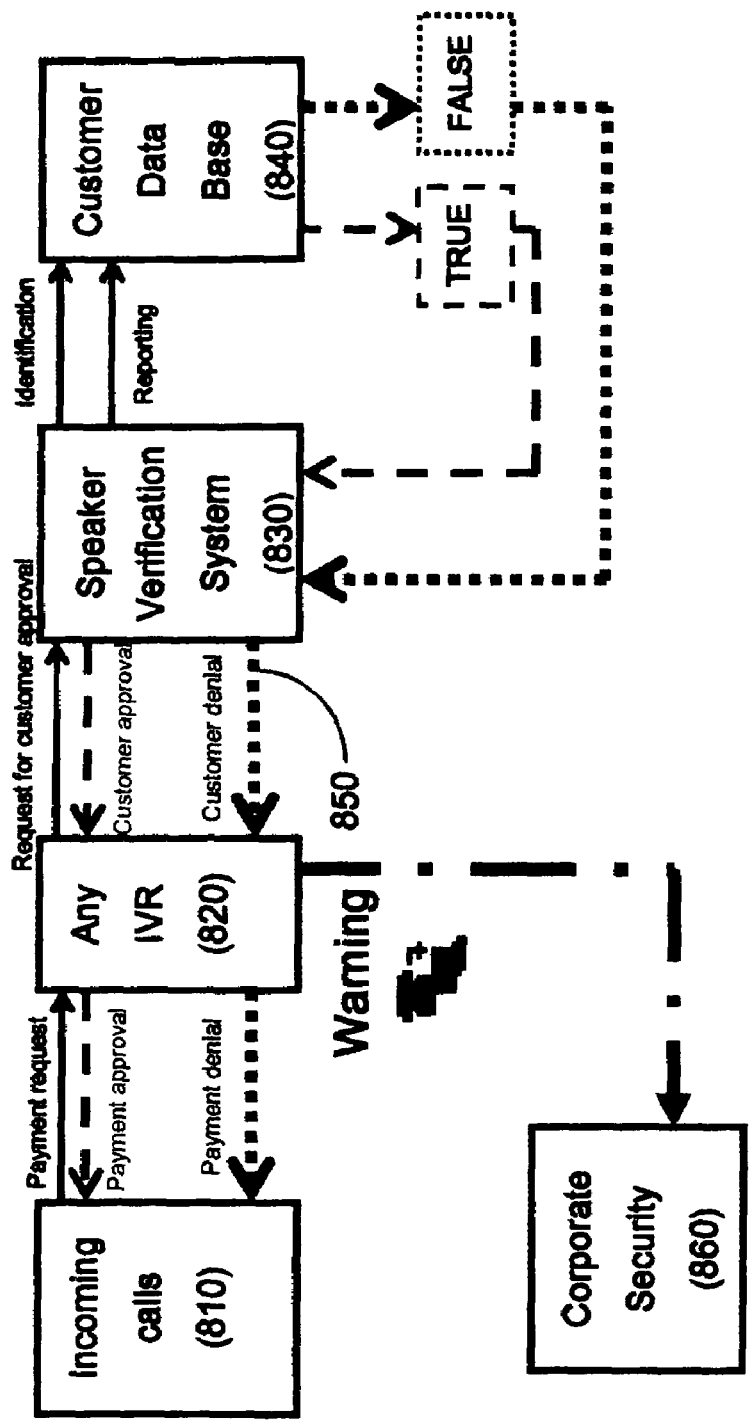
FIG. 8 is a generalized schematic block diagram of a verification and security system, according to the principles of the present invention.

FIG. 8 is a generalized schematic block diagram of verification and security systems, according to the principles of the present invention.

In an exemplary transaction, an incoming call 810, is received by an Interactive Voice Response (IVR) 820, which is a generic term for transaction systems allowing phone callers to use an ordinary tone-dialing telephone to interact with a computer through speech or dialed instructions. Each response by the caller triggers another recorded message until the transaction is completed. The speaker verification system 830 of the present invention, having modified versions in the following applications, accesses a customer database 840. If the system denies the customer's identity 850, a warning is issued to corporate security 860.

The present invention recognizes voices with an authentication system that provides instant identification of legitimate users and absolute rejection of anyone else. The system is an open, modular system that can be flexibly applied to any existing analog or digital network. The system provides reliable remote identification via ordinary phone lines without the need to give confidential information, and it increases revenues by developing customer loyalty, increasing repeat business, raising customer satisfaction, getting the sales that would have been missed, and reducing fraud. In short, the system makes life easier for honest people and harder for criminals.

Figure 9:
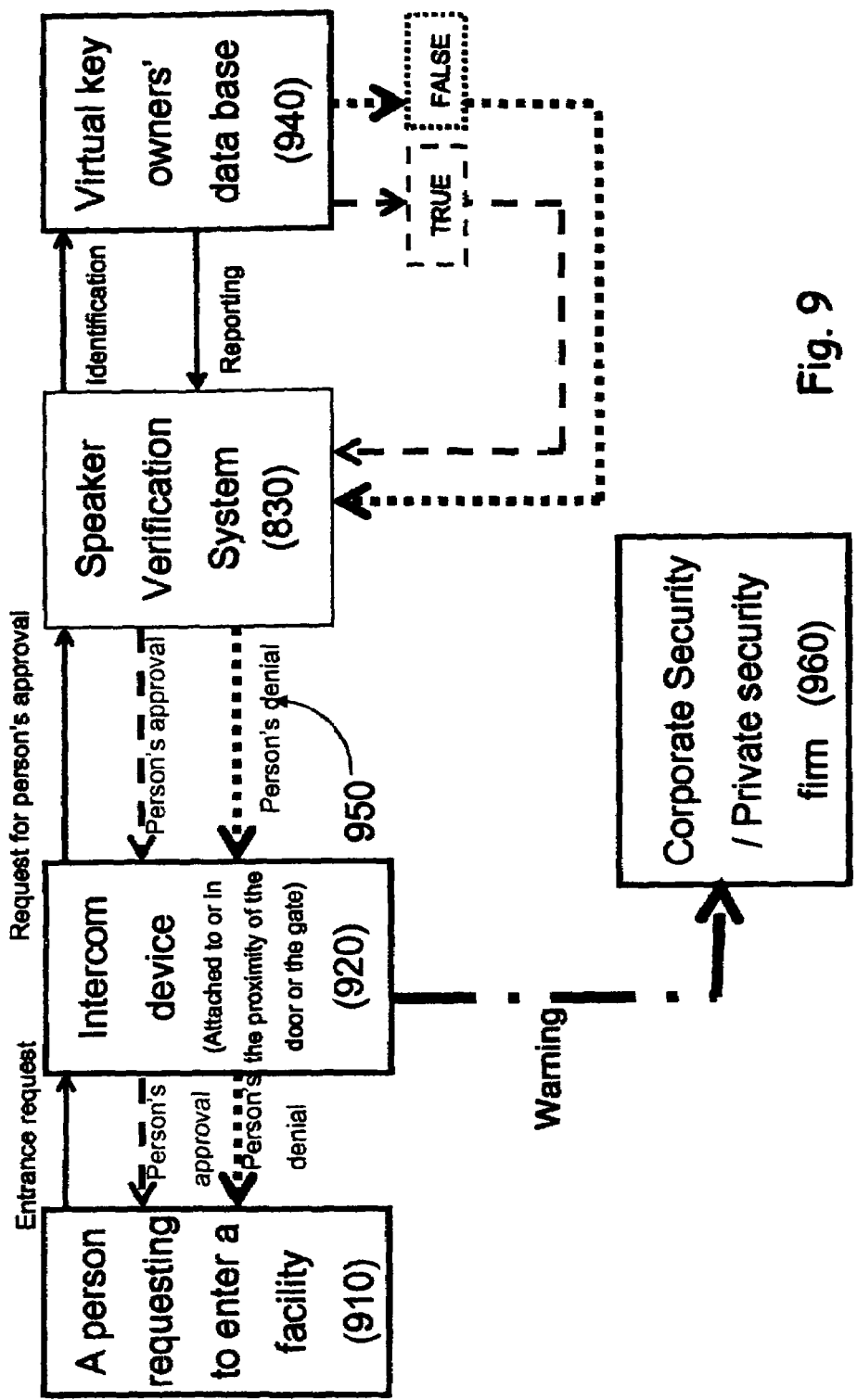
FIG. 9 is a generalized schematic block diagram of a keyless site entry system, according to the principles of the present invention.

FIG. 9 is a generalized schematic block diagram of keyless entry systems, according to the principles of the present invention. For example, a person requests to enter a facility 910, via an intercom device 920. The speaker verification system 830 of the present invention accesses a virtual key owners' database 940. If the system denies the person's identity 950, a warning is issued to a corporate or private security firm 960.

For example, for employee identification, the present invention provides both freedom and control. The employee simply speaks and his access can be controlled with no need for certification, worker cards, etc. Everything is done more easily and economically by interactions between the voice and a personal computer (PC), for example, where employee activities are checked, enabled, ordered, documented and invoiced.

Student identification and activities are made easier because of the control over entry to a lecture, test, library or laboratory, for example, simply by voice verification.

Personal security and home security are provided, because entry is enabled by one's voice only. Only authorized persons are allowed entry, and anyone else's attempted access is recorded.

Figure 10:
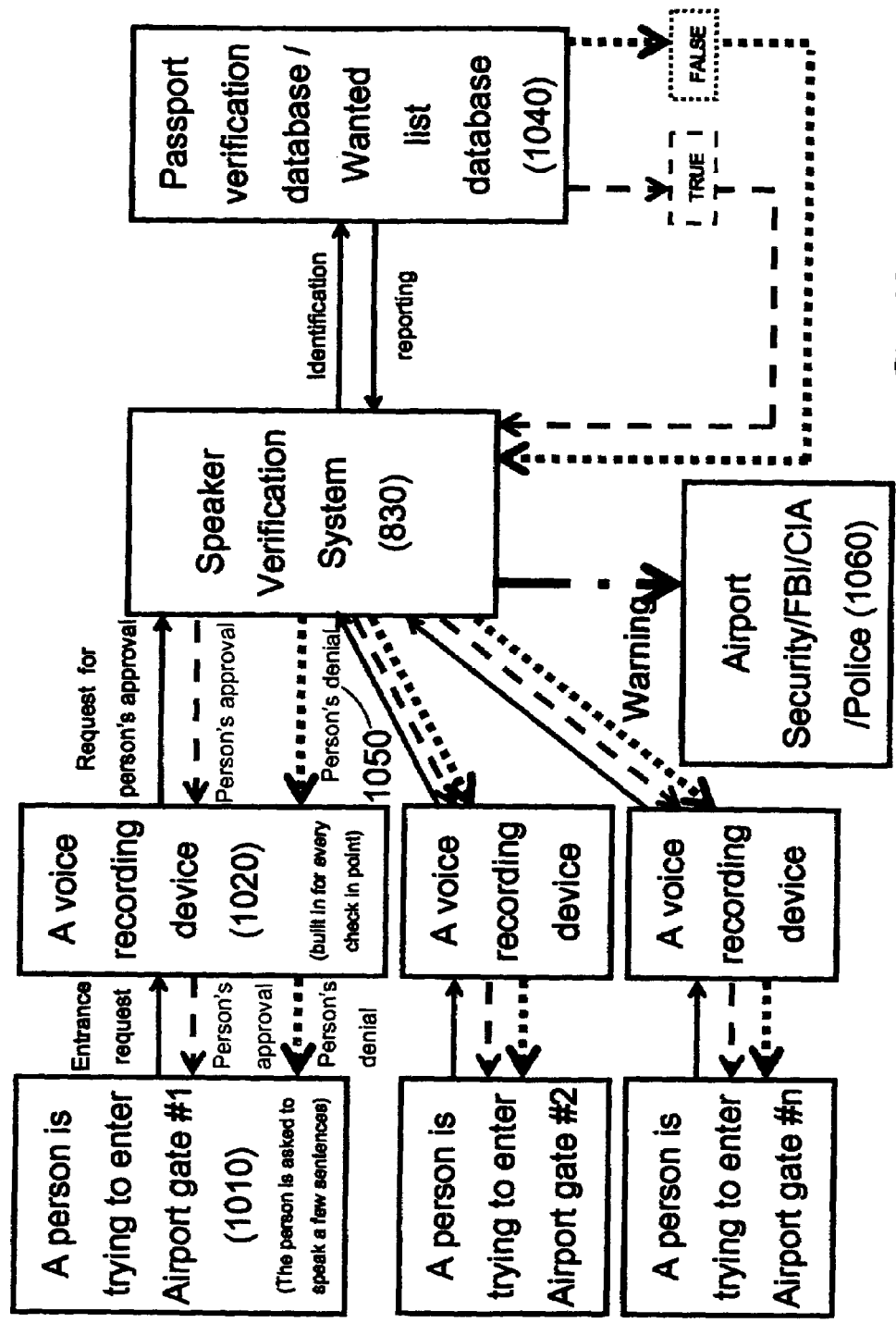
FIG. 10 is a schematic block diagram of an airport security application embodiment, according to the principles of the present invention.

FIG. 10 is a schematic block diagram of an airport security application embodiment, according to the principles of the present invention. In these security-conscious days of the post-September 11 world, getting four hundred people onto an airplane, or a thousand people into a factory or office building, is not a trivial task.

When identifying a lot of people in a hurry, the consequences of a single slip can be disastrous, but slow and obtrusive security checks can alienate honest people. With the present invention, everyone who belongs gets in just by saying a greeting. And no one who doesn't belong gets in. For example, a person requests to enter an airport gate 1010, via a voice recording device 1020. The speaker verification system 830 of the present invention accesses a passport verification database and/or a wanted list database 1040. If the system denies the person's identity 1050, a warning is issued to airport security, FBI, CIA or the local police 1060.

Figure 11:
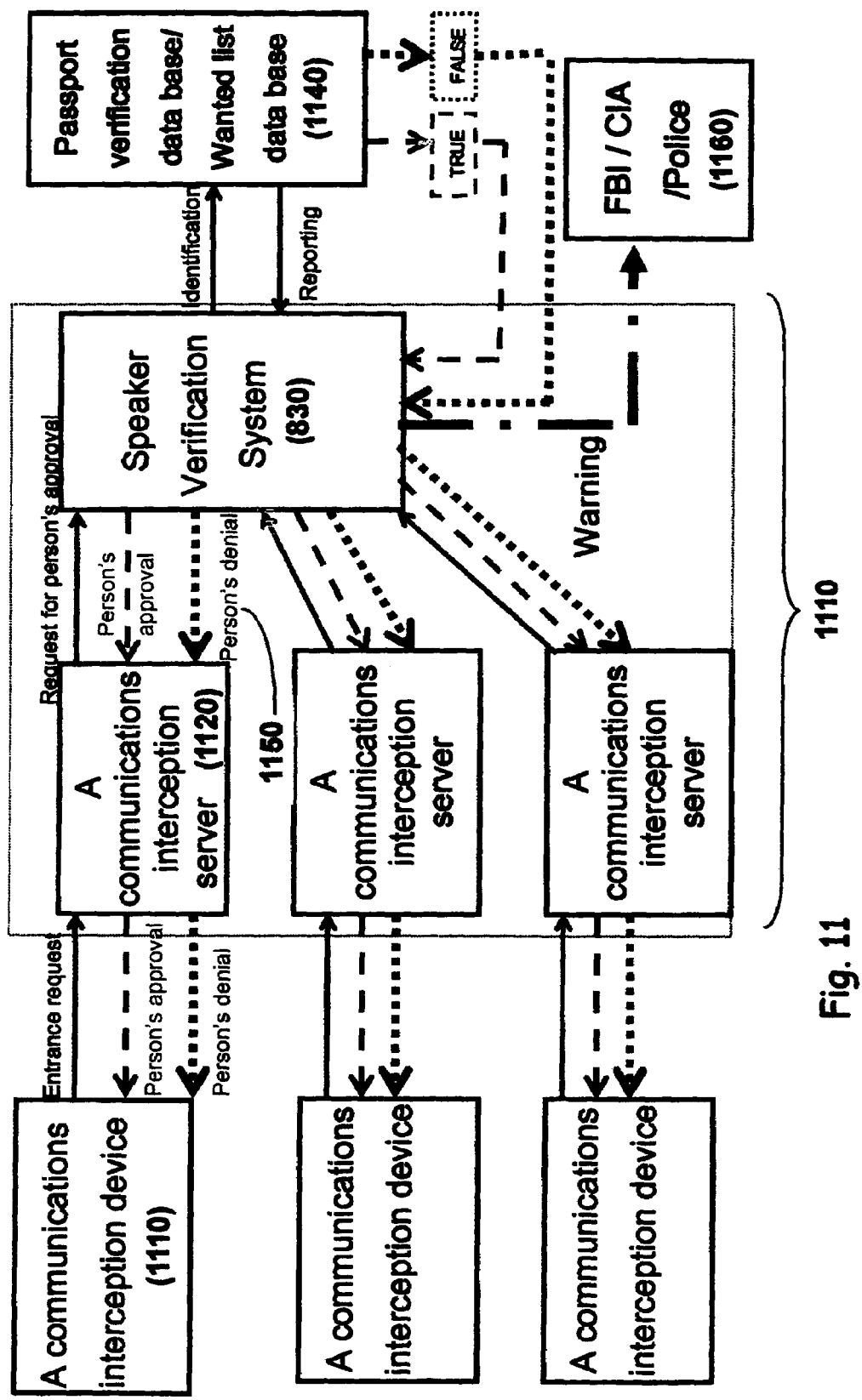
FIG. 11 is a schematic block diagram of an anti-terror security application embodiment, according to the principles of the present invention.

FIG. 11 is a schematic block diagram of an anti-terror security application embodiment, according to the principles of the present invention. Law enforcement and military organizations can benefit from the present invention by identifying personnel when critical and identifying wanted criminals or terrorists, thereby reducing the need to detain the innocent. Integration with communications interception devices can greatly enhance the effectivity of anti-crime and anti-terror actions. For example, a person requests to enter a facility. The request is processed by a communications interception device 1110, via a communications interception server 1120. The speaker verification system 830 of the present invention accesses a passport verification database and/or a wanted list database 1140. If the system denies the person's identity 1150, a warning is issued to the FBI, CIA or local police, for example 1160.

Figure 12:
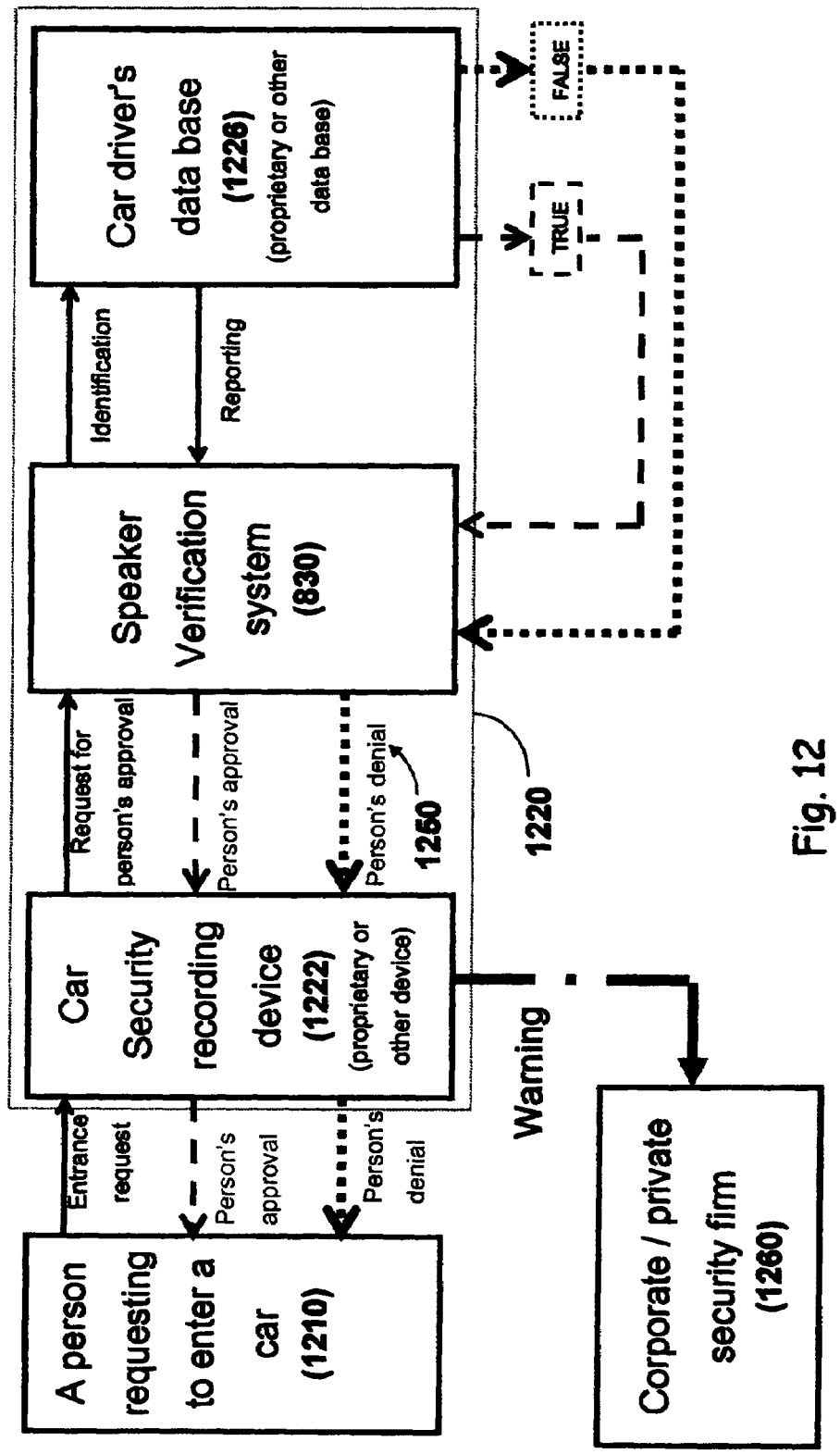
FIG. 12 is a schematic block diagram of a keyless automotive security application embodiment, according to the principles of the present invention.

FIG. 12 is a schematic block diagram of an automotive security application embodiment, according to the principles of the present invention. Occasionally one may lock his keys in his car, possibly with the engine running. A car with locks equipped with the present invention would allows entry with just a word. And only the owner, or those authorized can gain access in this way:

1. no fumbling for keys or even a keyless remote;
2. no standing out in the cold while your engine idles away a tank of gas; and
3. no hunting for a public phone in a strange neighborhood to call a locksmith.

The car knows its owner. Such locks are applicable for homes and hotels, too. One has a key that cannot be lost. For example, a person requests to enter a facility 1210, via a car security recording device 1222, which may be a component of the present invention 1220. The speaker verification system 830 of the present invention accesses a car drivers' database 1226. If the system denies the person's identity 1250, a warning is issued to a corporate or private security firm 1260.

Figure 13:
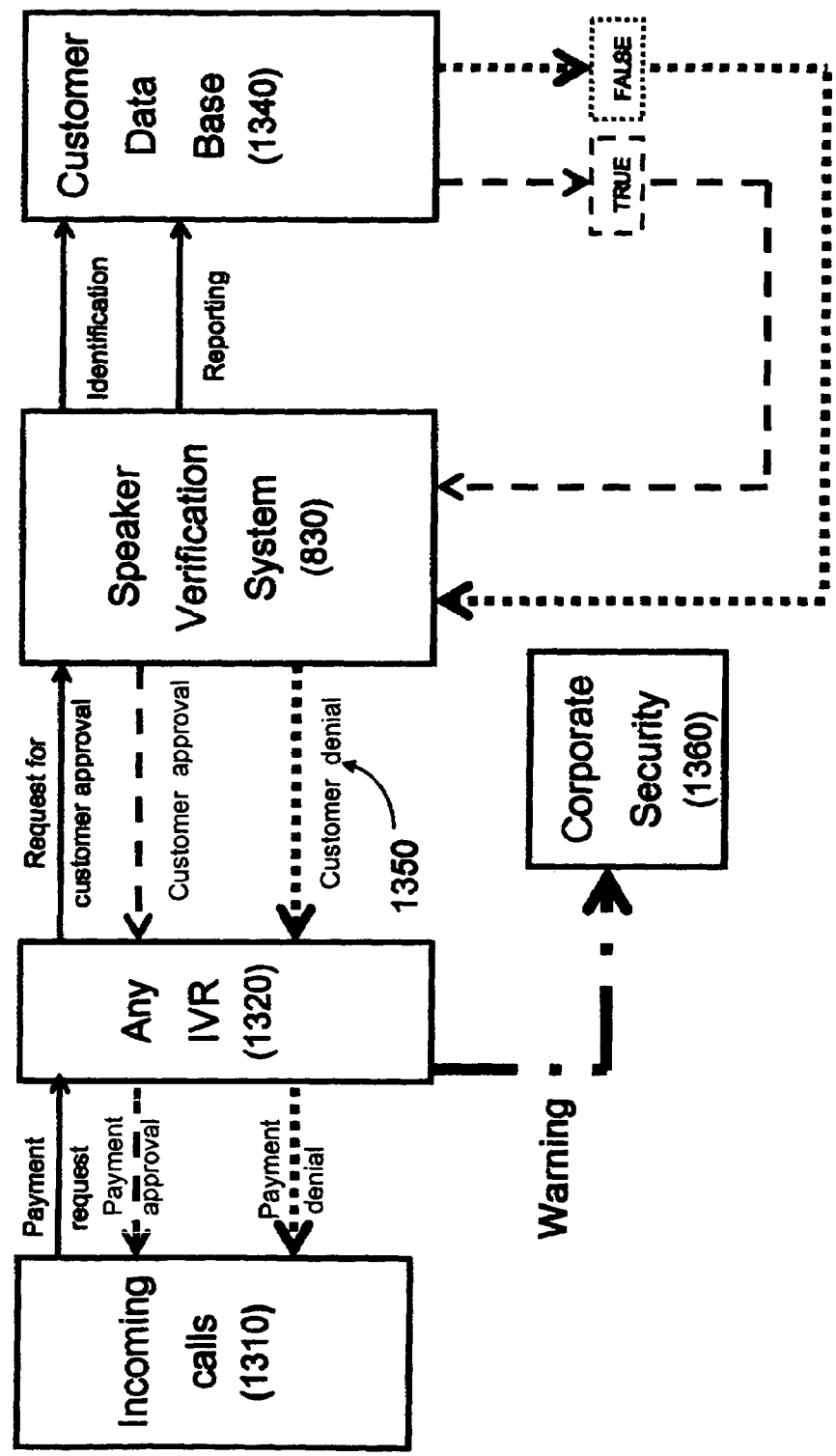
FIG. 13 is a schematic block diagram of a banking and credit application embodiment, according to the principles of the present invention

FIG. 13 is a schematic block diagram of a banking and credit application embodiment, according to the principles of the present invention, which allows customers to purchase when they want, where they want. One needs to know that credit purchases will actually get paid for. A large portion of the fees merchants pay to credit card companies goes to cover the cost of fraudulent transactions. With the present invention one can accept a personal check rather than lose a sale, but without the risk.

A reliable, economical and user-friendly automated voice response call center system handles purchases or bill payments. With the present invention one knows who one is dealing with before they have even said their name. Customers can be welcomed with a personalized greeting, and one can be ready to offer them the merchandise and services they want, based on past purchasing habits.

Many customers refuse to use their credit cards over the phone, and even face-to-face for fear that their credit card number or other personal identifying information will fall into the wrong hands, or that it will be used again without their consent. With the present invention every transaction is verifiable.

In an exemplary transaction, an incoming call 1310, is received by an Interactive Voice Response (IVR) 1320, which is a generic term for transaction systems allowing phone callers to use an ordinary tone-dialing telephone to interact with a computer through speech or dialed instructions. Each response by the caller triggers another recorded message until the transaction is completed. The speaker verification system 830 of the present invention accesses a customer database 1340. If the system denies the customer's identity 1350, a warning is issued to corporate security 1360.

Thus, speaking, i.e., leaving a voice authentication sample, in effect replaces the need for the memory aspect of a magnetic strip on the back of a user's credit card, as well as the need for a caller ID feature and leaving of a name on a telephone message.

As per the above, the present invention provides high security and ease of use.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A system for verifying and enabling user access based on voice parameters, said system comprising:

a voice registration unit for registering a user by finding the user's voice parameters in a voice registration sample containing raw data and storing same in a database to provide a substantially unique and initial identification of each of a plurality of users; and a voice authenticating unit for substantially accurate verification of an identity of one of said plurality of users, said voice authenticating unit comprising:

a recognition unit for providing a voice authentication sample, and being operative with said database; and a decision unit operative with said recognition unit and said database to decide whether the user associated with said voice authentication sample is the same as the identity of the user registered with the system and associated with said voice registration sample, such that said identity of one of said plurality of users is substantially accurately verified for access purposes, wherein the user's voice parameters are determined in accordance with a method comprising:

eliciting a voice registration sample of at least one utterance from the user, wherein the system asks the user to say some of his characteristics;

fractally analyzing said sample of at least one utterance, wherein the raw data of the user's voice is investigated and each sample gives a set of non-dimensional numbers, which characterize said voice registration sample uniquely;

spectrographically analyzing said sample of at least one utterance, wherein said raw data is investigated and generates a unique voiceprint for purposes of substantially unique identification, thereby allowing extraction of geometrical characteristics relative to the user's voice; and determining the Lyapunov exponents of said sample of at least one utterance, wherein a spectrum of said exponents are computed, which further characterize said voice registration sample uniquely, wherein the identification is done in stages, by eliciting a voice authentication sample of at least one utterance from the user, and repeating said fractal analysis, spectrographic analysis and Lyapunov exponent determination steps, while automatically adapting to a continuous change of the voice parameters to overcome inherent instability associated therewith, by adding to the voice registration sample with each instance of successful voice authentication, and wherein the identification process provides said substantially accurate verification by applying a branch and bound algorithm to the voice parameters of said voice registration sample to determine the closest fit with the voice parameters of said voice authentication sample, such that the system proceeds efficiently and within a practical time frame to shorten calculation periods and achieve a calculation result in a manageable fashion, in order to decide whether the user calling in for authentication is the same as the person of that identity registered in the system.

2. The system of claim 1, wherein the system is applied to e-commerce transactions over a communications network, wherein said voice registration sample is provided in a phone call.

3. The system of claim 2, wherein the communications network is a land-based line.

4. The system of claim 2, wherein the communications network is a wireless network.

5. The system of claim 2, wherein the communications network is a voice over Internet protocol network.

6. The system of claim 1, wherein the identity of one of said plurality of users during said call is verified to a substantially unambiguous accuracy.

7. The system of claim 1, wherein the system is applied to banking transactions.

8. The system of claim 7, wherein the system is global and a banking transaction can be made at any time, and wherein check writing is replaced by a voice transaction.

9. The system of claim 7, wherein ATM transactions are voice implemented.

10. The system of claim 7, wherein said voice authentication sample is used to make said access decision.

11. The system of claim 1, wherein the system is applied to credit transactions.

12. The system of claim 11, wherein said voice authentication sample replaces the magnetic strip on a credit card.

13. The system of claim 11, wherein said voice authentication sample replaces the caller ID feature in a telephone system.

14. The system of claim 11, wherein said voice authentication sample replaces the leaving of one's name in a voice message.

15. The system of claim 11, wherein the system prevents fraud and replaces plastic credit cards by implementation of a simple voice protocol.

16. The system of claim 1, wherein the system is applied to employee identification.

17. The system of claim 1, wherein the system is applied to airport security for traveler identification and a central information center knows what terminal the traveler is in now and whether he is allowed to board a specific flight.

18. The system of claim 1, wherein the system is applied to automotive keyless entry for prevention of auto theft, by replacing key entry and remote beeper entry by voice programmed entry.

19. The system of claim 1, wherein the system is applied to access control, operated and controlled by authorized voice only.

20. The system of claim 19, wherein the access is applied to at least one of the following:
a safe;
a vault;
a safety deposit box; and
a voice control service.

21. The system of claim 1, wherein the system is applied to law enforcement for identification from voice samples and fraud prevention.

22. The system of claim 1, wherein the system is applied to military for decision-making to control activities based on accurate real-time identification of personnel.

23. The system of claim 1, wherein said voice authentication sample is in any language.

24. The system of claim 1, wherein an attempt is made to disguise said voice authentication sample.

25. The system of claim 1, wherein said voice authentication sample is distorted unintentionally by the user.

26. The system of claim 1, wherein said voice authentication sample is distorted unintentionally by the user because of health problems.

27. The system of claim 1, wherein said system can differentiate between a natural voice authentication sample and an unnatural voice authentication sample.

28. The system of claim 27, wherein said unnatural voice authentication sample is made using a tape recording.

29. The system of claim 1, wherein said voice registration sample is text-dependent.

30. The system of claim 1, wherein said voice registration sample is text-independent.

31. The system of claim 1, wherein said voice authentication sample is text-dependent.

32. The system of claim 1, wherein said voice authentication sample is text-independent.

33. The system of claim 1, further comprising an interactive voice response unit for receiving a voice authentication sample from a user.

34. The system of claim 1, further comprising an intercom for receiving a voice authentication sample from a user.

35. The system of claim 34, wherein said intercom for receiving a voice authentication sample from a user is for purposes of access to a facility.

36. The system of claim 34, wherein said intercom for receiving a voice authentication sample from a user is for purposes of access to his home.

37. The system of claim 34, wherein said intercom for receiving a voice authentication sample from a user is for purposes of access to an automobile.

38. The system of claim 1, wherein said database is a virtual key owner's database.

39. The system of claim 1, wherein said database is a passport database.

40. The system of claim 1, wherein said database is a "wanted list" database.

41. The system of claim 1, wherein said database is a car owners database.

42. The system of claim 1, wherein said database is a database of automotive drivers.

43. The system of claim 1, wherein said voice authentication sample replaces the key to a car.

44. The system of claim 1, wherein said voice authentication sample replaces the key to a house.

45. The system of claim 1, further comprising at least one voice recording device for receiving a voice authentication sample from a plurality of users in a plurality of locations.

46. The system of claim 45, wherein said plurality of users in a plurality of locations is at an airport.

47. The system of claim 45, wherein said plurality of users in a plurality of locations is at a corporate facility.

48. The system of claim 45, wherein said plurality of users in a plurality of locations is at a government facility.

49. A method for the purpose of interactively conducting secure, computerized, voice-based e-commerce transactions operated over a communications network, by registering and authenticating a plurality of users with a system provided for the purpose, the method comprising;
- registering the plurality of users with the system, by having each user call into the system for registration;
- eliciting a voice registration sample containing raw data of at least one utterance if from the user, wherein the system asks the user to say some of his characteristics;
- fractally analyzing said sample of at least one utterance, wherein the raw data of the speaker's voice is investigated and each sample gives a set of non-dimensional numbers, which characterize said voice registration sample uniquely;
- spectrographically analyzing said sample of at least one utterance, wherein said raw data is investigated and generates a unique voiceprint for purposes of substantially unique identification, thereby allowing extraction of geometrical characteristics relative to the speaker's voice; and
- determining the Lyapunov exponents of said sample of at least one utterance, wherein a spectrum of said exponents are computed, which further characterize said voice registration sample uniquely,
- wherein the identification is done in stages, by eliciting a voice authentication sample of at least one utterance from the user; and
- repeating said fractal analysis, spectrographic analysis and Lyapunov exponent determination steps, while automatically adapting to a continuous change of the voice parameters to overcome inherent instability associated therewith, by adding to the voice registration sample with each instance of successful voice authentication,
- and wherein the identification process provides said substantially accurate verification by applying a branch and bound algorithm to the voice parameters of said voice registration sample to determine the closest fit with the voice parameters of said voice authentication sample,
- such that the system proceeds efficiently and within a practical time frame to shorten calculation periods and achieve a calculation result in a manageable fashion, in order to decide whether the user calling in for authentication is the same as the person of that identity registered in the system.

50. The method of claim 49, further comprising learning by the system after each authentication of each of said plurality of users.

51. The method of claim 49, further comprising repeating the steps after calling into the system, in the case where the identification fails, thereby allowing the system another chance for identification.

52. The method of claim 49, further comprising analyzing by the technique of dynamic time warping (DTW).

53. The method of claim 49, wherein spectrographically analyzing further comprises using an FFT to provide a sixteen (16) dimension feature vector.

54. The method of claim 49, wherein said branch and bound algorithm comprises a column-wise expansion of a dynamic time warping (DTW) matrix of said at least one utterance.

55. A method for verifying and enabling user access based on voice parameters, by registering and authenticating a plurality of users with a system provided for the purpose, said method comprising:
- registering the plurality of users with the system by having each user call into the system for registration;
- eliciting a voice registration sample containing raw data of at least one utterance from the user, wherein the system asks the user to say some of his characteristics;
- fractally analyzing said sample of at least one utterance, wherein the raw data of the speaker's voice is investigated and each sample gives a set of non-dimensional numbers, which characterize said voice registration sample uniquely;
- spectrographically analyzing said sample of at least one utterance, wherein said raw data is investigated and generates a unique voiceprint for purposes of substantially unique identification, thereby allowing extraction of geometrical characteristics relative to the speaker's voice; and
- determining the Lyapunov exponents of said sample of at least one utterance, wherein a spectrum of said exponents are computed, which further characterize said voice registration sample uniquely,
- wherein the identification is done in stages, by eliciting a voice authentication sample of at least one utterance from the user; and
- repeating said fractal analysis, spectrographic analysis and Lyapunov exponent determination steps, while automatically adapting to a continuous change of the voice parameters to overcome inherent instability associated therewith, by adding to the voice registration sample with each instance of successful voice authentication,
- and wherein the identification process provides said substantially accurate verification by applying a branch and bound algorithm to the voice parameters of said voice registration sample to determine the closest fit with the voice parameters of said voice authentication sample,
- such that the system proceeds efficiently and within a practical time frame to shorten calculation periods and achieve a calculation result in a manageable fashion, in order to decide whether the user calling in for authentication is the same as the person of that identity registered in the system.

* * * * *